(12) United States Patent
Bonnaudet

(10) Patent No.: US 11,155,137 B2
(45) Date of Patent: Oct. 26, 2021

(54) SUSPENSION STOP OF A MOTOR VEHICLE

(71) Applicant: NTN-SNR ROULEMENTS, Annecy (FR)

(72) Inventor: Aurélien Bonnaudet, Annecy (FR)

(73) Assignee: NTN-SNR Roulements, Annecy (FR)

( * ) Notice: Subject to any disclaimer, the term of this patent is extended or adjusted under 35 U.S.C. 154(b) by 135 days.

(21) Appl. No.: 16/517,945

(22) Filed: Jul. 22, 2019

(65) Prior Publication Data

US 2020/0031187 A1    Jan. 30, 2020

(30) Foreign Application Priority Data

Jul. 25, 2018   (FR) ...................................... 18 56939

(51) Int. Cl.
| | |
|---|---|
| *B60G 15/00* | (2006.01) |
| *B60G 15/06* | (2006.01) |
| *F16C 33/78* | (2006.01) |

(52) U.S. Cl.
CPC ........... *B60G 15/00* (2013.01); *B60G 15/067* (2013.01); *B60G 2204/124* (2013.01); *B60G 2204/418* (2013.01); *F16C 33/7886* (2013.01)

(58) Field of Classification Search
CPC .............. B60G 15/00; B60G 15/067; B60G 2204/124; B60G 2204/418; B60G 15/068; F16C 33/7886
See application file for complete search history.

(56) References Cited

U.S. PATENT DOCUMENTS

| | | | | |
|---|---|---|---|---|
| 2003/0002764 A1* | 1/2003 | Pflugner | ................ | B60G 15/00 384/609 |
| 2010/0308555 A1* | 12/2010 | Lenon | ..................... | F16C 19/10 280/124.155 |
| 2011/0133379 A1* | 6/2011 | Viault | ..................... | F16C 35/04 267/217 |
| 2012/0308167 A1* | 12/2012 | Chamousset | ........... | F16C 33/80 384/91 |

(Continued)

FOREIGN PATENT DOCUMENTS

| | | | | |
|---|---|---|---|---|
| EP | 1870265 A1 * | 12/2007 | ............. | F16J 15/441 |
| FR | 2865008 A1 * | 7/2005 | ............. | F16C 35/04 |

(Continued)

OTHER PUBLICATIONS

Machine Translation of WO2016030638 (Year: 2016).*

*Primary Examiner* — Ruth Ilan
*Assistant Examiner* — Kurtis Nielson
(74) *Attorney, Agent, or Firm* — Murtha Cullina LLP

(57) ABSTRACT

The invention relates to a suspension stop with an upper cup and a lower cup arranged to form between them an annular chamber which is delimited laterally by two walls. The chamber having an external section formed between a bearing surface of each wall respectively, the suspension stop having an external sealing element with two complementary bearing surfaces. The external sealing element is mounted to be mobile in the external section between a stable position in which the complementary bearing surfaces are arranged at a distance from the bearing surfaces of the external section and a stressed position by bearing on the external sealing element in which the complementary bearing surfaces are forced against one of the bearing surfaces to ensure the sealing of the external section at the interface thereof.

17 Claims, 2 Drawing Sheets

(56) References Cited

U.S. PATENT DOCUMENTS

| | | | | |
|---|---|---|---|---|
| 2013/0313766 | A1* | 11/2013 | Bussit | F16C 33/761 |
| | | | | 267/195 |
| 2016/0059659 | A1* | 3/2016 | Bussit | B60G 15/068 |
| | | | | 384/611 |
| 2016/0146253 | A1* | 5/2016 | Weiss, II | F16F 9/54 |
| | | | | 188/321.11 |
| 2017/0219038 | A1* | 8/2017 | Lepine | F16C 33/30 |
| 2020/0062062 | A1* | 2/2020 | Jeong | F16C 33/7813 |

FOREIGN PATENT DOCUMENTS

| | | | | |
|---|---|---|---|---|
| FR | 2910944 A1 * | 7/2008 | | F16C 33/7893 |
| FR | 2985220 B1 * | 2/2014 | | F16J 15/3452 |
| WO | 2009019340 A2 | 2/2009 | | |
| WO | WO-2011120563 A1 * | 10/2011 | | B60G 99/00 |
| WO | WO-2016030638 A1 * | 3/2016 | | F16C 33/7886 |

\* cited by examiner

SUSPENSION STOP OF A MOTOR VEHICLE

CROSS-REFERENCE TO RELATED APPLICATION

This application claims the priority of French patent application number 18 56939, filed on Jul. 25, 2018, the entire contents of which are incorporated herein by reference.

TECHNICAL FIELD

The invention relates to a suspension stop of a motor vehicle, designed in particular to be integrated into a telescopic suspension strut of a driving wheel of the motor vehicle.

BACKGROUND

The invention applies to a suspension stop comprising an upper fixed cup designed to be connected to the bodywork of the vehicle, a lower rotating cup comprising a bearing for the suspension spring, and rolling bodies arranged between the cups to allow their relative rotation. In one variant, the cups can be mounted in relative rotation in a smooth manner, with or without the interposition of a friction washer between them.

In particular, the invention applies to such a suspension stop, in which the cups are arranged to form between them at least one annular chamber in which a sealing element is arranged, and this to prevent on the one hand the leaking of lubricant provided in the space between the cups, and on the other hand the contamination of the space with pollutants from the exterior.

To achieve this, it is known to provide sealing elements in the form of annular crowns which are mounted in annular grooves formed for this purpose in the sealing chamber.

Document WO-2009/019340 proposes a sealing element which is arranged in the sealing chamber to be in frictional contact with each of the cups and which is mounted to be mobile relative to at least one cup. Thus, a compromise between the sealing function and the induced torque is obtained in a particularly satisfying manner, even in the case of the deformation of the suspension stop from the effect of the applied stresses.

However, the suspension stop can be subjected to projections of external pollutants, for example jets of water and/or mud, particularly when the vehicle is used in bad weather on muddy ground and/or ground covered with puddles.

In this case the pollutants can be projected at high speed against the sealing element which, being mobile, may be displaced in the sealing chamber, thereby breaking the frictional contact and causing the entry of pollutants into the chamber.

Such projections are simulated specifically during test phases of the suspension stop, by introducing a jet of pressurised liquid into the opening of the sealing chamber.

The aim of the invention is to improve the prior art by proposing in particular a suspension stop in which the seal is improved, particularly by protecting the chamber from the introduction of such jets of pollutants.

To that effect, the invention proposes a suspension stop of a motor vehicle, the suspension stop comprising an upper cup and a lower cup which are mounted in relative rotation about an axis, the cups being arranged to form between them at least one annular chamber which is delimited laterally by two walls coming from one of the cups respectively, the chamber having an external section formed between a bearing surface of a wall respectively, the suspension stop comprising an external sealing element which has two complementary bearing surfaces, the external sealing element being mounted to be mobile in the external section between a stable position in which the complementary bearing surfaces are arranged at a distance from the bearing surfaces of the external section and a stressed position by bearing on the external sealing element in which the complementary bearing surfaces are forced respectively onto one of the bearing surfaces to ensure the sealing of the external section at the interface thereof.

BRIEF DESCRIPTION OF THE DRAWINGS

Other features and advantages of the invention are given in the following description made with reference to the attached figures, in which.

DETAILED DESCRIPTION

Figure 1:
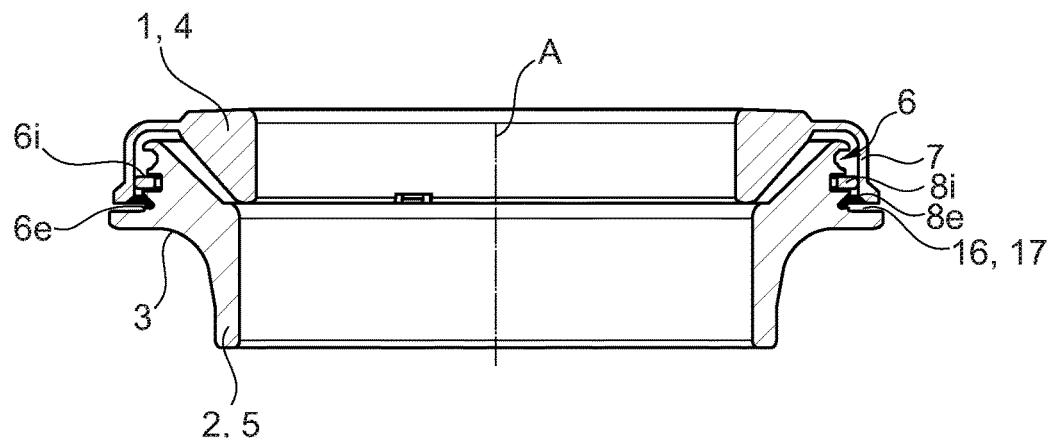
FIG. 1 shows an axial cross-section of a suspension stop according to an embodiment of the invention, FIG. 1a being an enlarged partial view of FIG. 1 centred on the right side of the sealing chamber, and FIG. 1b being a partial enlarged view of FIG. 1a, which shows more particularly the external section of the sealing chamber.
Figure 1A:
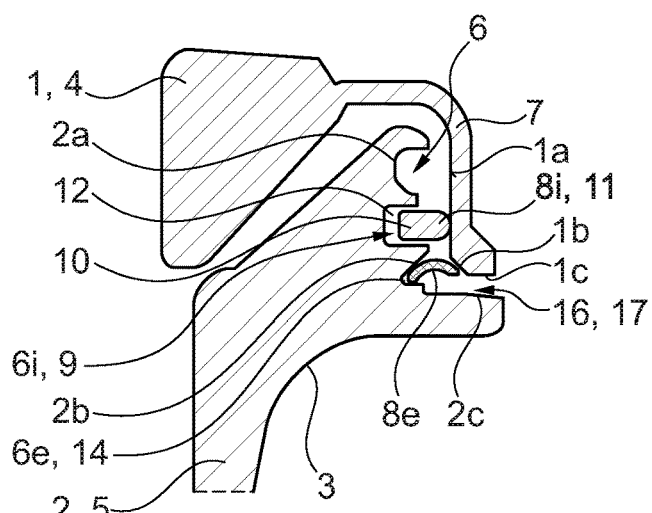

In this description, the terms used for positions in space are given with reference to the axis of rotation A of the suspension stop (vertical in FIG. 1). In particular, the term "interior" relates to an arrangement close to the axis A and the term "exterior" relates to an arrangement at a distance from the axis A. Furthermore, the terms "upper" and "lower" relate to the arrangement of the suspension stop as represented in the figures, and the terms "internal" and "external" relate to an arrangement relative to the interior of the stop.

A wheel of a motor vehicle, in particular a driving wheel, is mounted on the chassis by means of a suspension strut which enables the suspension of the bodywork relative to the ground. For this purpose, the suspension strut generally comprises a shock absorber, a suspension spring as well as a suspension stop on which the spring bears directly or indirectly.

With reference to the figures, a suspension stop is described below which comprises a fixed upper cup 1 designed to be connected to the bodywork of the vehicle specifically via a filtering unit, and a rotary lower cup 2 comprising a support 3 for the suspension spring, the cups being mounted in relative rotation about an axis A. Thus, when the spring is tensioned in compression and in detent, the winding of the coils of the latter onto themselves is modified, which causes the rotation of the lower cup 2. Furthermore, the turning of the wheels also causes a rotation of the lower cup 2.

In a known manner, a suspension stop can comprise rolling bodies which are arranged between the cups to enable their relative rotation about the axis A. To achieve this, the upper 1 and lower 2 cups can each comprise a washer, made in particular from stamped sheet metal, which is provided with respectively a lower and upper roller track for the rolling bodies. In one variant, the cups 1, 2 can be mounted in relative rotation in a smooth manner, with or without the interposition of a frictional washer between them.

The suspension stop also comprises two covering pieces, in particular made by moulding a rigid thermoplastic material, for example made of polyamide 6.6. These pieces are respectively a cover 4 connected to the upper washer to be interposed between the chassis and the upper washer, and a support 5 connected below the lower washer, the support comprising the spring support 3. These covering pieces 4, 5 enable in particular the recovery of the spring forces and possibly those of the bump stop.

The cups 1, 2 are arranged to form between them at least one annular chamber 6, which is delimited laterally by two walls 1a, 2a coming from one of the cups respectively.

In the embodiments shown, the cover 4 comprises an annular exterior skirt 7 on which an axial exterior wall 1a extends, the support 5 having an axial exterior wall 2a delimiting an annular sealing chamber 6 with the axial exterior wall 1a of the skirt.

In particular, the annular chamber 6 presents a radial clearance so as to enable the rotation of the lower cup 2 relative to the upper cup 1 without any interference between the latter.

In order to prevent on the one hand the leaking of lubricant provided in the space between the cups 1, 2, and on the other hand the contamination of the space by exterior pollutants, at least one sealing element 8i, 8e is arranged in the annular chamber 6.

According to one embodiment, the chamber 6 can contain a viscous substance to improve the sealing effect provided by the sealing element 8i, 8e. In particular, the substance can also have a lubricating function for displacements of the sealing element 8i, 8e in the chamber 6.

In the figures, the chamber 6 has an internal section 6i equipped with an internal sealing element 8i which is arranged between the walls 1a, 2a of the cups 1, 2.

In an advantageous manner, the internal sealing element 8i is mounted to be mobile relative to each of the cups 1, 2, which makes it possible to achieve a particularly satisfying compromise between the sealing function and the induced torque, even in the case of deformation of the suspension stop from the effect of the applied stresses.

According to another embodiment, the internal sealing element 8i can be in frictional contact with a cup 1, 2, in order to improve the sealing function of the element 8i, 8e.

One of the axial walls 1a, 2a has an annular groove 9 in which a crown 10 of the internal sealing element 8i is arranged, the internal sealing element having a segment 11 interacting with the other wall 1a, 2a.

In the shown embodiment, the annular groove 9 is formed in the axial wall 2a of the lower cup 2. In one variant, the groove 9 can be formed on the axial wall 1a of the upper cup 1.

The crown 10 forms an axial and/or radial clearance 12 with the groove 9, in order to enable a free displacement of the crown in the groove. To achieve this, the crown 10 can have in particular a geometry complementary to that of the groove 9 with a reduced radial and/or axial dimension.

In the embodiments shown, the crown 10 forms with the groove 9 a clearance 12 which extend in a U shape at the interface between the crown and the groove, thus forming a sealing baffle.

The groove 9 and the crown 10 have respectively a radial depth and length which are sufficiently large to ensure a good effectiveness of the sealing baffle. Furthermore, the interacting segment 11 bears radially on the axial wall 1a of the exterior cup 1.

When the vehicle is used in bad weather on muddy ground and/or ground covered with puddles, jets of water and/or mud can be projected at high speeds against the sealing element 8i, which due to its mobility may be displaced in the sealing chamber 6 causing the rupture of the frictional contact, such that the pollutants can then enter into the chamber.

To protect the sealing element 8i from such projections of exterior pollutants, the sealing chamber 6 has an external section 6e formed between a bearing surface 1b, 2b of one wall 1a, 2a respectively, and in which an external sealing element 8e is arranged.

In the embodiments shown, the sealing elements 8i, 8e both have an annular geometry. Furthermore, the sealing elements 8i, 8e are made in particular from a rigid thermoplastic material, for example polyoxymethylene, polyethylene, polypropylene, polyamide 6, 6.6, 11 or 12.

The external sealing element 8e has a sealing face 15 on which two complementary bearing surfaces 13 are formed, and is mounted to be mobile in the external section 6e between a stable position, in which the complementary bearing surfaces 13 are arranged at a distance from the bearing surfaces 1b, 2b, and a stressed position from bearing on the external sealing element 8e, in particular by a jet of exterior pollutants, in which the complementary bearing surfaces 13 are forced against one of the bearing surfaces 1b, 2b respectively to ensure the sealing of the external section 6e at the interface thereof.

Thus, as shown in the figures, in the absence of projections of exterior pollutants, the external sealing element 8e is in contact with only one of the cups 1, 2, so as not to induce additional frictional torque for the suspension stop. Furthermore, the sealing element 8e in a stable position forms an additional sealing baffle in the chamber 6, which improves the sealing of the chamber further.

When a projection of exterior pollutant comes into contact with the external sealing element 8e, the element is displaced into a stressed position to form a sealing contact and form a barrier to the projection of exterior pollutant.

Furthermore, after the projection of pollutant, the element 8e is no longer stressed and then returns to a stable position, which makes it possible to break the sealing contact between the bearing surfaces 1a, 2a and the complementary bearing surfaces 13, and thus not induce frictional torque between two projections. Furthermore, in case pollutants pass beyond the external section 6e, the return of the element to a stable position enables these potential pollutants to flow outside of the chamber 6.

In the embodiments shown, the external section 6e is oriented downwards, the sealing element 8e being raised in a stressed position. Thus, the return of the sealing element 8e into a stable position stable is performed by gravity.

At least one bearing surface 1b, 2b is bordered by a housing 14 in which the sealing element 8e is held in a stable position in the external section 6e, in order to ensure the centring of the element in the section while restricting its displacement. In the figures, the housing 14 is formed on the axial wall 2a of the lower cup 2 so as to extend below the bearing surface 2b. Furthermore, the other bearing surface 1b is formed on the free end of the skirt 7.

Figure 1B:
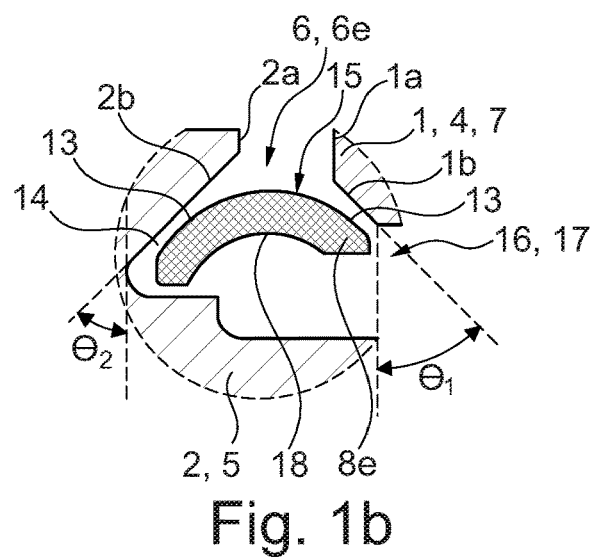
Figure 2:
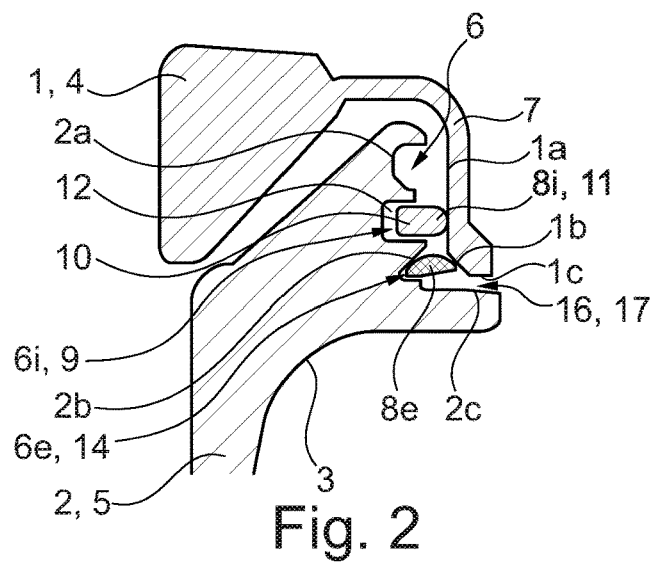
FIG. 2 is a view similar to FIG. 1a for a suspension stop according to another embodiment of the invention.
Figure 3A:
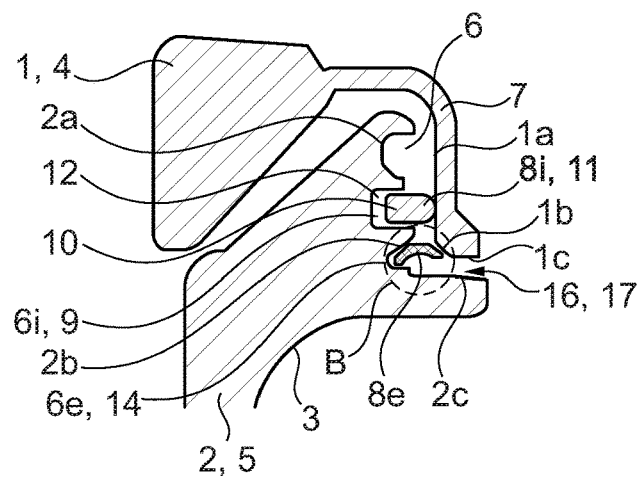
FIG. 3a is a view similar to FIGS. 1a and 2 for a suspension stop according to another embodiment of the invention, FIG. 3b being a partial enlarged view of zone B of FIG. 3a, similar to FIG. 1b.
Figure 3B:
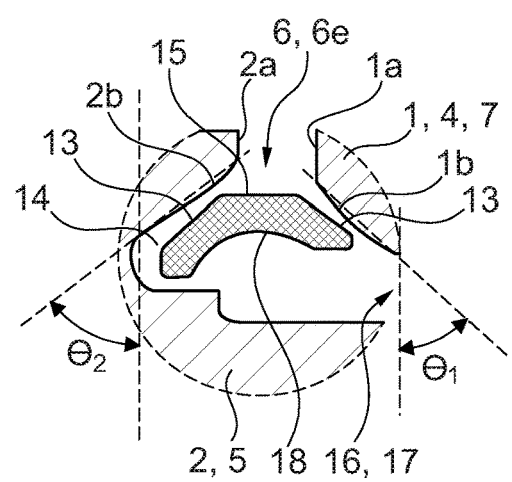

In relation to FIGS. 1b and 3b, the bearing surfaces 1b, 2b are inclined relative to the axis of rotation A by an angle $\theta_1$ and $\theta_2$ respectively. In an advantageous manner, the angles $\theta_1$ and $\theta_2$ are substantially such that $\theta_1 = -\theta_2$, which makes it possible to ensure symmetry between the respective supports of complementary bearing surfaces 13 on each of the bearing surfaces 1b, 2b.

One among the bearing surfaces 1b, 2b and the complementary bearing surfaces 13 are substantially planar, the other among the bearing surfaces 1b, 2b and the complementary bearing surfaces 13 being curved. Thus, when the element 8e is in a stressed position, the sealing is ensured by forcing a toric surface against a truncated conical surface. In particular, the element 8e can be slightly deformable to enable displacement at the point where the bearing surfaces 1b, 2b and the complementary bearing surfaces 13 are forced together.

In FIGS. 1, 1a, 1b and 2, the bearing surfaces 1b, 2b are substantially planar, the complementary bearing surfaces 13 being curved. In particular, the sealing face 15 has a convex geometry so as to form curved complementary bearing surfaces 13 on either side.

In FIGS. 3a and 3b, the bearing surfaces 1b, 2b are curved, and the complementary bearing surfaces 13 are substantially planar.

The external section 6e has an opening 16 which is formed between two walls 1c, 2c of respectively a cup 1, 2. In particular, the walls 1c, 2c form between them a reduced baffle clearance 17 of the opening 16, in order to form a barrier designed to reduce the speed and/or the power of a projection of pollutant entering through the opening.

The walls 1c, 2c extend substantially radially to form an axial clearance which surrounds the external sealing element 8e. Furthermore, the external sealing element 8e has a support face 18 opposite to the sealing face 15 and facing which the opening 16 opens to the interior. In a preferred manner, the opening 16 is positioned axially below the external sealing element 8e.

Thus, when a projection of exterior pollutant enters through the opening 16, the position of the clearance 17 makes it possible to direct the projection onto the support face 18, so as to concentrate the pressure on the face, and thus to enable the correct installation of the element 8e in its stressed position.

In an advantageous manner, as shown in FIGS. 1, 1a, 1b, 3a and 3b, the support face 18 has a concave geometry, which makes it possible to improve the guiding on the latter of projections of pollutants.

What is claimed is:

1. A suspension stop of a motor vehicle, the suspension stop comprising an upper cup and a lower cup which are mounted in relative rotation about a first axis, the cups being arranged to form between them at least one annular chamber which is delimited laterally by two walls, one wall from each of the cups respectively, the chamber having an external section formed between a bearing surface of one wall respectively, wherein the suspension stop comprises an external sealing element which has two complementary bearing surfaces, the external sealing element being mounted to be mobile in the external section between a stable position in which the complementary bearing surfaces are arranged at a distance from the bearing surfaces of the external section, and a stressed position by bearing on the external sealing element in which the complementary bearing surfaces are forced against respectively one of the bearing surfaces to ensure a sealing of the external section at an interface thereof.

2. The suspension stop according to claim 1, wherein the external section is oriented downwards, the external sealing element being raised in the stressed position.

3. The suspension stop according to claim 1, wherein the bearing surfaces are inclined relative to the first axis of rotation by an angle respectively θ1 and θ2.

4. The suspension stop according to claim 3, wherein the angles θ1 and θ2 are such that: $\theta_1 = -\theta_2$.

5. The suspension stop according to claim 1, wherein one among the bearing surfaces and the complementary bearing surfaces are substantially planar, the other among the bearing surfaces and the complementary bearing surfaces being curved.

6. The suspension stop according to claim 1, wherein at least one bearing surface is bordered by a housing in which the external sealing element is held in the stable position in the external section.

7. The suspension stop according to claim 1, wherein the external sealing element has a sealing face on which the complementary bearing surfaces are formed.

8. The suspension stop according to claim 7, wherein the sealing face has a convex geometry forming curved complementary bearing surfaces on either side.

9. The suspension stop according to claim 7, wherein the external sealing element has a support face which is opposite to the sealing face.

10. Suspension stop according to claim 9, wherein the support face has a concave geometry.

11. The suspension stop according to claim 1, wherein the external section has an opening which is formed between the two walls, one wall from each cup, the walls forming between them a reduced baffle clearance of the opening.

12. The suspension stop according to claim 11, wherein the walls extend substantially radially to form an axial clearance which surrounds the external sealing element.

13. The suspension stop according to claim 11, wherein the opening is located axially below the external sealing element.

14. The suspension stop according to claim 1, wherein the chamber has an internal section provided with an internal sealing element which is arranged between the walls of the cups.

15. The suspension stop according to claim 14, wherein one of the walls has an annular groove in which a crown of the internal sealing element is arranged, the internal sealing element having a segment for interacting with the other wall.

16. The suspension stop according to claim 15, wherein the crown forms an axial and/or radial clearance with the groove to enable a displacement of the crown in the groove.

17. The suspension stop according to claim 14, wherein the external sealing element and the internal sealing element are made from a rigid thermoplastic material.

* * * * *